(12) United States Patent
Arning et al.

(10) Patent No.: US 10,518,443 B2
(45) Date of Patent: Dec. 31, 2019

(54) ROTARY TABLET PRESS

(71) Applicant: Fette Compacting GmbH, Schwarzenbek (DE)

(72) Inventors: Andreas Arning, Talkau (DE); Nils Petersen, Hohnstorf (DE)

(73) Assignee: Fette Compacting GmbH, Schwarzenbek (DE)

( * ) Notice: Subject to any disclaimer, the term of this patent is extended or adjusted under 35 U.S.C. 154(b) by 138 days.

(21) Appl. No.: 15/410,985

(22) Filed: Jan. 20, 2017

(65) Prior Publication Data

US 2017/0210042 A1  Jul. 27, 2017

(30) Foreign Application Priority Data

Jan. 21, 2016 (DE) .................. 10 2016 101 027

(51) Int. Cl.
| | |
|---|---|
| *B29C 43/58* | (2006.01) |
| *B07C 5/34* | (2006.01) |
| *B29C 31/00* | (2006.01) |
| *B29C 43/04* | (2006.01) |
| *B29C 43/56* | (2006.01) |
| *B30B 11/08* | (2006.01) |

(Continued)

(52) U.S. Cl.
CPC .............. *B29C 43/58* (2013.01); *B07C 5/34* (2013.01); *B29C 31/002* (2013.01); *B29C 43/04* (2013.01); *B29C 43/56* (2013.01); *B30B 11/08* (2013.01); *B30B 15/022* (2013.01); *B30B 15/32* (2013.01); *B07C 2501/0036* (2013.01); *B29C 2043/043* (2013.01); *B29C 2043/563* (2013.01); *B29C 2043/585* (2013.01)

(58) Field of Classification Search
CPC . B07C 5/363; B29C 43/58; B29C 2043/5808; B29C 2043/5825; B29C 2043/585; B29C 2043/5866; B29C 2043/5875
See application file for complete search history.

(56) References Cited

U.S. PATENT DOCUMENTS

| | | | |
|---|---|---|---|
| 4,772,251 A | 9/1988 | Goppelt et al. | |
| 5,040,353 A * | 8/1991 | Evans | B07C 5/3404 209/644 |

(Continued)

FOREIGN PATENT DOCUMENTS

| | | | |
|---|---|---|---|
| DE | 2450065 A1 | 4/1976 | |
| DE | 3636918 A1 | 5/1988 | |

(Continued)

OTHER PUBLICATIONS

Machine translation of WO 2008/087223, retrieved Apr. 1, 2019 (Year: 2019).*

(Continued)

*Primary Examiner* — Timothy Kennedy
(74) *Attorney, Agent, or Firm* — Barclay Damon LLP

(57) ABSTRACT

A rotary tablet press having a rotatably driven rotor and a die plate with a plurality of die bores. A plurality of upper and lower punches are configured to produce tablets in the plurality of die bores. The tablets are monitored for one or more characteristics and are sorted by an ejection apparatus according to the one or more characteristics into a reject channel and a satisfactory channel.

17 Claims, 3 Drawing Sheets

(51) Int. Cl.
*B30B 15/02* (2006.01)
*B30B 15/32* (2006.01)

(56) References Cited

U.S. PATENT DOCUMENTS

| | | | | |
|---|---|---|---|---|
| 5,322,655 | A * | 6/1994 | Ebey | ........................ B07C 5/365 264/109 |
| 8,078,329 | B2 * | 12/2011 | Boeckx | .................... B07C 5/363 209/644 |
| 8,801,416 | B2 | 8/2014 | Uneme | |
| 2004/0207107 | A1 * | 10/2004 | Christiaens | ............... B08B 3/02 264/39 |
| 2015/0375268 | A1 | 12/2015 | Hegel et al. | |

FOREIGN PATENT DOCUMENTS

| | | | |
|---|---|---|---|
| DE | 102005061787 A1 | 6/2007 | |
| DE | 102005062715 B4 | 8/2007 | |
| DE | 102013202975 A1 | 8/2014 | |
| EP | 1688243 B1 | 8/2006 | |
| JP | 2006193261 A | 7/2006 | |
| JP | 2012006058 A | 1/2012 | |
| WO | WO-2008087223 A1 * | 7/2008 | ........... B08B 15/026 |

OTHER PUBLICATIONS

EP17151994.5; Filing Date Jan. 18, 2017; EP Search Report dated Jul. 3, 2017; 7 pages.

* cited by examiner

ROTARY TABLET PRESS

CROSS REFERENCE TO RELATED INVENTION

This application is based upon and claims priority to, under relevant sections of 35 U.S.C. § 119, German Patent Application No. 10 2016 101 027.8, filed Jan. 21, 2016, the entire contents of which are hereby incorporated by reference.

BACKGROUND

The invention relates to a rotary tablet press comprising a rotatably driven rotor having a die plate with die bores and a plurality of upper and lower punches circulating with the die plate for producing tablets in the die bores, wherein the die plate of the rotor is assigned a deflector which deflects tablets, which are produced in the die bores and ejected by the lower punches from the die bores, from the upper face of the die plate into a satisfactory channel, wherein in the rotational direction of the rotor a reject channel is arranged upstream of the satisfactory channel, an ejection apparatus being assigned thereto for ejecting tablets into the reject channel, wherein moreover a monitoring apparatus is arranged on the rotary tablet press, said monitoring apparatus monitoring at least one property of the tablets produced in the die bores and producing a reject signal for a control apparatus when the monitored property of a tablet deviates inadmissibly from a reference value, so that the control apparatus actuates the ejection apparatus for ejecting the reject, or unsatisfactory tablet.

Tablets produced in a rotary tablet press are generally deflected into a satisfactory channel by means of a deflector from the die plate rotating below the deflector. The deflector may, for example, have a sickle-shaped deflection edge. Powdery material, which has been filled into the die bores of the die plate, is pressed by the upper and lower punches of a rotary tablet press in the die bores to form tablets. After the compression, the tablets are pushed by the lower punches out of the die bores toward the upper face of the die plate, so that they may be removed from the die plate by the deflector.

BRIEF SUMMARY OF THE INVENTION

During the tablet production a monitoring apparatus monitors the tablets for specific parameters. For example, a pressing force measuring apparatus is able to monitor whether the pressing force which prevails during the compression of the tablet is within an admissible reference value range. If the monitoring apparatus establishes an inadmissible deviation from a reference value, it produces a reject signal which is emitted to a control apparatus, for example the machine controller of the rotary tablet press. The control apparatus then controls the ejection apparatus for targeted ejection of the reject tablet. To this end, the ejection apparatus may be configured as an ejection nozzle which produces a puff of gas, in particular a puff of air, which blows the satisfactory tablet from the die plate, before reaching the deflector, into a reject channel arranged in the rotational direction of the rotor upstream of the satisfactory channel.

Such a rotary tablet press is disclosed, for example, in EP 1 688 243 B1. In this case, the tablets entering the reject channel or the satisfactory channel have to be conveyed further through the reject channel or, respectively, the satisfactory channel. To this end, the rotary tablet press disclosed in EP 1 688 243 B1 has a nozzle arrangement provided for the reject channel and for the satisfactory channel. The nozzle arrangements produce an airflow into the reject channel or, respectively, into the satisfactory channel so that the tablets are discharged through the reject channel or, respectively, the satisfactory channel. A further nozzle arrangement is provided, said nozzle arrangement producing an airflow oriented toward a deflection portion of the deflector. The nozzle arrangements may have a series of nozzle openings arranged adjacent to one another so that air mist or, respectively, an air curtain is produced.

A drawback in the known rotary tablet press is that the nozzle arrangements result in tablet dust being raised and undesirable contamination of the rotary tablet press or, respectively, the surroundings. Also, tablets which do not easily slide may result in a back-up of tablets and interruptions to the production or even damage. The further discharge of the tablets through the reject channel or, respectively, the satisfactory channel generally takes place by forming the reject channel or, respectively, the satisfactory channel as a steeply sloping chute so that the tablets are discharged by the assistance of gravity. Thus the height level of the tablets which is often necessary for subsequent treatment devices is often lost. Also, a clear detection of ejected reject tablets is not always ensured. Thus in the prior art the pressure build-up of the respective nozzle arrangement is monitored for detecting the ejected reject tablets. If the nozzle arrangement is, for example, blocked by dust being raised and as a result a greater pressure is built up, this may lead to faulty detection results.

It is known from U.S. Pat. No. 8,801,416 A to discharge tablets produced in a tablet press by vacuum apparatuses. In this case, tablets are initially supplied from the die plate to a tablet reservoir as a result of gravity. From this tablet reservoir the tablets are then conveyed further by a vacuum apparatus. A drawback in the known tablet press is that when the press stops, for example, loose tablets may remain on the die plate. These loose tablets may collide with subsequently produced tablets when the pressing operation then starts up again due to their inertia and lead to a back-up of tablets. Moreover, a construction comprising a tablet reservoir is costly.

Proceeding from the prior art set forth, the object of the invention is to provide a rotary tablet press of the type mentioned in the introduction in which tablets are able to be ejected in a simple manner into a reject channel or, respectively, a satisfactory channel, without it resulting in undesirable raising of dust or a collision or back-up of tablets. Ejected reject tablets are also intended to be able to be clearly detected.

The invention achieves the object for a rotary tablet press of the type mentioned in the introduction in that a first vacuum apparatus is arranged in the reject channel, such that tablets ejected by the ejection apparatus in the direction of the reject channel are discharged by the vacuum produced by the first vacuum apparatus through the reject channel and in that a second vacuum apparatus is arranged in the satisfactory channel, such that tablets deflected by the deflector in the direction of the satisfactory channel are suctioned from the die plate by the vacuum produced by the second vacuum apparatus and are discharged through the satisfactory channel.

The monitoring apparatus provided according to the invention, for example, may be a pressing force measuring apparatus of the rotary tablet press which measures the pressing force produced during the pressing of the tablets. The control apparatus may, for example, be the machine controller of the rotary tablet press. As mentioned in the introduction, the monitoring apparatus monitors at least one property of the tablets produced, for example the pressing force produced in the course of production, and compares this property with a reference value. If an inadmissible deviation from the reference value is established, the monitoring apparatus emits a corresponding reject signal to the control apparatus. Immediately, the control apparatus activates the ejection apparatus such that the tablet identified as a reject is ejected into the reject channel. The ejection apparatus may be an ejection nozzle which produces a puff of gas, preferably a puff of air, by which tablets to be ejected before reaching the deflector are blown from the die plate into the reject channel. However, a mechanical ejection apparatus which mechanically ejects tablets to be ejected into the reject channel is also conceivable.

According to the invention, a first vacuum apparatus is arranged in the reject channel and a second vacuum apparatus is arranged in the satisfactory channel. Tablets ejected in the direction of the reject channel are discharged through the reject channel by the suction produced by the first vacuum apparatus. Tablets deflected in the direction of the satisfactory channel are suctioned from the die plate by the suction produced by the second vacuum apparatus and discharged through the satisfactory channel. In a vacuum apparatus, a vacuum is produced, for example, by the provision of a cross-sectional narrowing or the blowing of a compressed gas, for example compressed air, in a circular manner. As a result of this vacuum, gas, for example air, is suctioned and entrained in the direction of flow through the further channel line. This gas, in particular air, which is entrained due to the suction produced by the vacuum apparatus thus conveys the tablets through the reject channel or, respectively, the satisfactory channel. At the same time, in particular, tablets are already suctioned from the die plate by the second vacuum apparatus arranged in the satisfactory channel and conveyed further through the satisfactory channel. In particular, according to the invention all tablets which have been ejected from the die bores by the second vacuum apparatus, and which have not been deflected by the ejection apparatus in the direction of the reject channel, are suctioned into the satisfactory channel. The tablets are reliably prevented from bouncing and when the rotary tablet press is started or, respectively, stopped. No loose tablets are located on the die plate so that immediately after the start of the pressing process a reliable ejection may take place. Such loose tablets could, immediately after a start-up process, slip to the rear by their mass inertia and hinder subsequent satisfactory tablets in their direction of flow.

The tablets may, in particular, be suctioned solely by the suction produced by the respective vacuum apparatus and conveyed through the reject channel or, respectively, the satisfactory channel. Assistance by gravity through channels which are inclined in the manner of chutes, however, is also conceivable. Naturally, in each case a plurality of vacuum apparatuses may also be provided for the reject channel or, respectively, the satisfactory channel.

Nozzle arrangements provided in the prior art for conveying the tablets through the reject channel or, respectively, the satisfactory channel may be dispensed with according to the invention. As a result, the raising of dust and soiling in the prior art devices are avoided. In contrast, the tablets including any tablet dust are suctioned off and the pressing chamber of the rotary tablet press remains clean. At the same time, the vacuum apparatuses act in a deionising manner and static discharges of the tablets are dissipated. The tablets are accelerated and separated into the reject channel or, respectively, the satisfactory channel so that the spaces between the tablets become larger. As a result, the tablets are reliably prevented from backing-up. Shunts may also be easily arranged between individual tablets by the increased space between the tablets suctioned by the vacuum apparatuses. By means of the path of the reject channel or, respectively, the satisfactory channel or, respectively, a channel guidance system optionally adjacent thereto, a respectively required height level for further processing devices may be adjusted in a variable and flexible manner. The consumption of gas, in particular air, by the vacuum apparatuses is in this case not greater than in the nozzle arrangements known from the prior art. The tablet transport may take place, for example, at a flow velocity of the air of 6 to 16 m/s. The tablet conveying speed is thus slightly greater than the circumferential speed of the rotor of the rotary tablet press. It may be, for example, ca. 2 to 3 m/s.

According to one embodiment it may be provided that the first vacuum apparatus is a Venturi nozzle or, respectively, that the second vacuum apparatus is a Venturi nozzle. For example, the path of conveyance of the tablets ejected into the reject channel may pass through a cross-sectional narrowing of the first Venturi nozzle, so that the tablets are conveyed further through the reject channel by gas suctioned in the region of the cross-sectional narrowing, and the path of conveyance of the tablets deflected into the satisfactory channel may pass through a cross-sectional narrowing of the second Venturi nozzle, so that the tablets are conveyed further through the satisfactory channel by gas suctioned in the region of the cross-sectional narrowing. The tablets are thus conveyed through the cross-sectional narrowing of the Venturi nozzles and entrained and conveyed further by the gas flow, in particular the air flow, suctioned in the region of the cross-sectional narrowing.

According to a further embodiment, the satisfactory channel may discharge into a conveyor channel downstream of the second vacuum apparatus. The conveyor channel may be formed by conveying tubes. Moreover, the conveyor channel may comprise downstream of the second vacuum apparatus a rising channel portion leading to a greater height level relative to the second vacuum apparatus. For processing the tablets in further devices it is often necessary to move the tablets to a greater height relative to the tablet outlet. This upward conveyance takes place in the invention in a particularly simple manner by means of a vacuum apparatus. A complex, heavy and costly spiral-shaped vibrating conveyor, as for example is disclosed in DE 10 2005 062 715 B4, may be dispensed with. Moreover, the energy requirement in comparison with vibrating conveyors is low and vibrations which may interfere with tablet monitoring apparatuses, for example with tablet weighing devices, are avoided. The conveyance of the tablets may take place more rapidly so that measuring data, obtained in a tablet monitoring apparatus arranged downstream, are also available more rapidly for regulating the rotary tablet press. This minimizes rejects.

A falling channel portion leading to a lower height level may be adjoined to the rising channel portion. After reaching the falling channel portion the tablets may be conveyed further as a result of gravity, in particular to further devices.

A suction channel may be connected to the falling channel portion, said suction channel being in turn connected to a suction pump which suctions gas, in particular air, via the suction channel from the falling channel portion counter to the direction of conveyance of the tablets. By this embodiment, the gravitational movement of the tablets is braked by the falling channel portion. The braking of the tablets avoids an acceleration which is too violent as a result of gravity, and the risk of damage associated therewith. At the same time, a prior removal of dust from the tablets takes place by means of the suction. The suction channel may, in particular, be adjoined in the region of the start of the falling channel portion adjacent to the rising channel portion.

According to a further embodiment, the conveyor channel may consist of a plurality of channel portions releasably connected together, wherein at least some of the channel portions are rotatable relative to one another. This embodiment permits a particularly simple and flexible adaptation of the conveyor channel to the individual spatial circumstances. Both the length and the respective height differences of the rising and falling channel portions and the alignment of the individual channel portions of the conveyor channel may be varied in a simple manner in this embodiment. The layout of the rotary tablet press may be designed to be more flexible and, by a rotation of the channel portions containing, for example, a circular cross section, tablets may be conveyed and discharged virtually on all sides. Thus the spatial conditions may be optimally met by the operator of the rotary tablet press. The space requirement is low.

The conveyor channel may lead to further processing devices, for example a dust removal or, respectively, deburring device as well as one or more monitoring apparatuses. A collection container may be located at the end of the conveyor channel for ejecting satisfactory tablets for further use, in particular, for packaging. In particular, the conveyor channel may be connected to a tablet dust removal or, respectively, deburring device, the tablets conveyed through the conveyor channel being supplied thereto, wherein the tablet dust removal or, respectively, deburring device in turn is connected to a collection container, tablets conveyed by the tablet dust removal or, respectively, deburring device being supplied thereto. The tablet dust removal or, respectively, deburring device may be a mechanical dust removal or, respectively, deburring device, for example a screening drum-dust removal or, respectively, deburring device. Conventional screening drum-dust removal or, respectively, dust removal devices are only able to carry out small upward conveying movements. By the combination according to the invention comprising a vacuum apparatus, however, such screening drum-dust removal or, respectively, deburring devices may be used in a simple manner. The dust removal or, respectively, deburring device may, in particular, be a Gratex device provided by the Applicant. Such a device has a rotating screening drum and thus ensures gentle mechanical dust removal and deburring of the tablets. The falling channel portion may discharge into the dust removal or, respectively, deburring device so that the tablets are supplied to the dust removal or, respectively, deburring device as a result of gravity, simply braked by the gas flow in the opposing direction produced by the suction pump. The dust removal or, respectively, deburring device in turn may be connected, via a further falling channel portion leading to an even lower height level, to a collection container for the satisfactory tablets to be dispensed and provided for further processing, wherein the tablets coming from the dust removal or, respectively, deburring device may in turn be supplied to the collection container as a result of gravity.

The production costs of a screening drum-dust removal or, respectively, deburring device are considerably lower than those of a vibrating conveyor used in the prior art for dust removal. The screening drum serves at the same time as a buffer in order to ensure in the event of a power failure, for example, that unmonitored tablets do not enter into the production area of satisfactory tablets. Also, during the start-up of a production process, the screening drum may rotate to the rear and optionally empty out tablets still located on the screening drum counter to the direction of conveyance into a reject container. Tablets leave the screening drum exclusively by the mechanical force of the spiral-shaped path of conveyance counter to the gas flow, in particular the air flow, produced by the suction pump. As a result, dust is prevented from escaping. Operating personnel and the pressing chamber are considerably less contaminated.

According to a further embodiment, a shunt may be arranged in the conveyor channel allowing for tablets to be removed from the conveyor channel and supplied to a tablet monitoring apparatus connected to the shunt. The tablet monitoring apparatus may be arranged, in particular, downstream of the dust removal or, respectively, deburring device. The tablet monitoring apparatus may automatically measure significant tablet parameters, for example weight, thickness, hardness and diameter. For example, it may be a tablet monitoring apparatus which is marketed by the Applicant under the name Checkmaster. Based on the measurement results of the tablet monitoring apparatus, a control apparatus is able to influence the production process of the rotary tablet press.

In particular, the aforementioned screening drum-dust removal or, respectively, deburring devices have optimal dust removal properties and a very rapid throughput time. Accordingly, the removal of tablet samples for monitoring in the monitoring apparatus used may take place downstream of the dust removal or, respectively, deburring device. In contrast to a spiral-shaped vibrating conveyor, the measurement results may be used for controlling the production process of the rotary tablet press, in particular in view of the short throughput time, by minimizing rejects. When using vibrating conveyors, however, in order to avoid unnecessary rejects, it is often necessary to supply the tablet monitoring apparatus with tablets upstream of the vibrating conveyor. The dust formation caused by the tablets which have not yet been dedusted, however, interrupts the operational reliability of the tablet monitoring apparatus. These drawbacks are avoided in the aforementioned embodiment according to the invention.

It is also possible to arrange a metal monitoring apparatus in the conveyor channel which detects metal residues in tablets. A shunt arranged downstream of the metal monitoring apparatus in the direction of conveyance may be activated when detecting metal residues, so that the corresponding tablets are supplied to a reject container.

According to a further embodiment, it may be provided that the conveyor channel and an optionally provided dust removal or, respectively, deburring device are arranged in a gas-tight isolated chamber, the atmosphere thereof being able to be replaced via an exhaust air line and an air supply line, wherein the tablet outlet of the rotary tablet press is connected in a gas-tight manner to the conveyor channel. Via the air supply line and the exhaust air line, if required the isolated chamber may also be placed under a vacuum relative to the surroundings. The gas-tight connection of the tablet outlet to the conveyor channel may comprise an inflatable seal. Provided the conveyor channel is connected to a collection container, this connection is also gas-tight. A tablet monitoring apparatus may also be arranged in the isolated chamber. In conventional arrangements comprising an isolated chamber, generally window flaps are provided between the isolated chamber and the rotary tablet press. As a result, the replacement of the atmosphere of the isolated chamber and the rotary tablet press has to be undertaken separately in a complex manner. By a direct coupling of the isolated chamber to the rotary tablet press, in particular by an inflatable seal, the isolated chamber may be docked directly to the rotary tablet press. Thus it is possible to replace the atmosphere of the isolated chamber and the atmosphere of the rotary tablet press via a common exhaust air line and a common air supply line. Also, the isolated chamber and the rotary tablet press may be placed together under a vacuum.

According to a further embodiment it may be provided that a first detector device is arranged in the reject channel, said first detector device detecting tablets passing through the reject channel or, respectively, a second detector device is arranged in the satisfactory channel, said second detector device detecting tablets passing through the satisfactory channel. The first detector device may comprise a light barrier or, respectively, the second detector device may comprise a light barrier. Moreover, the first detector device may be arranged in the first vacuum apparatus or, respectively, the second detector device may be arranged in the second vacuum apparatus. The light barriers may, in particular, be tubular light barriers. As already mentioned, in the prior art a detection of ejected tablets takes place by monitoring the pressure build-up in nozzle arrangements used for the transport of tablets through the reject channel or, respectively, the satisfactory channel. As also mentioned above, for example, a blockage of the nozzle arrangements may lead to faulty detection results. Moreover, often there is the desire to produce a redundant detection of ejected tablets. This is possible with the embodiments according to the invention mentioned above. As mentioned above, tablet dust is suctioned off by the use of a vacuum apparatus. This applies, in particular, inside the vacuum apparatus in the direction of flow directly downstream of the connection of the suction tube portion. For example, light barriers may be positioned in this region, the optics thereof remaining clean at all times, so that said light barriers may reliably detect tablets conveyed by the vacuum apparatus. The light barrier may thus be arranged in the direction of flow of the gas or, respectively, of the air through the cross-sectional narrowing of the vacuum apparatus immediately downstream of the connection region of the suction pipe portion for the gas, in particular air, suctioned by the vacuum. Since a corresponding light barrier is positioned both in the reject channel and in the satisfactory channel, on the one hand, the ejected tablets conveyed through the reject channel are directly detected. On the other hand, in the tablet flow discharged through the satisfactory channel a gap corresponding to the rejected reject tablet may be detected and thus indirectly the rejected tablet. Thus a reliable redundant monitoring of tablet ejection is ensured. Faulty detection results due to blocked nozzle openings are eliminated. A further advantage of the detection apparatuses provided in this embodiment according to the invention is the identification of a back-up of tablets. In the prior art costly capacitive tablet back-up detectors are used for this purpose. By the use of the detector apparatuses described according to the above embodiments, a back-up of tablets may be easily ascertained when the corresponding detector device, in particular the light barrier, detects no interruptions or a permanent interruption.

According to a further embodiment, moreover, a cleaning apparatus may be provided with a cleaning line, which is able to be connected to the satisfactory channel or, respectively, the reject channel or, respectively, the first vacuum apparatus or, respectively, the second vacuum apparatus, and a cleaning fluid supply, the cleaning line being able to be supplied thereby with a cleaning fluid for cleaning. In this case the vacuum apparatuses may be used for assisting the cleaning action. Thus, for example, cleaning fluid introduced into the pressing chamber of the rotary tablet press may also be suctioned off the die plate and, due to the vacuum, suctioned through the reject channel and the satisfactory channel.

The rotary tablet press according to the invention may also comprise a vacuum control apparatus which controls the vacuum produced by the first vacuum apparatus and the vacuum produced by the second vacuum apparatus, wherein the vacuum control apparatus is able to adjust the vacuum produced by the first vacuum apparatus and the vacuum produced by the second vacuum apparatus independently of one another, in particular in a variable manner. The vacuum control apparatus may also comprise a memory apparatus in which for specific operating modes reference values of vacuums for the first and the second vacuum apparatuses, for example specific to the products to be compressed, are stored. Then depending on the respective operating mode the vacuum control apparatus accesses the memory apparatus and adjusts the vacuums produced by the first or, respectively, second vacuum apparatus to the respectively stored value. In this manner, the vacuum apparatuses may be adjusted in a particularly targeted manner to the respective application.

The rotary tablet press may be a multiple rotary tablet press, for example a double rotary tablet press. It may be provided that it has several pairs of satisfactory channels and reject channels, wherein a deflector is assigned to each satisfactory channel and an ejection apparatus is assigned to each reject channel for ejecting tablets into the reject channel, wherein a control apparatus actuates the respective ejection apparatus based on a reject signal produced by a monitoring apparatus for ejecting the reject tablet, and wherein a first vacuum apparatus is arranged in each reject channel such that tablets ejected by the respective ejection apparatus in the direction of the respective reject channel are discharged by the vacuum produced by the respective first vacuum apparatus through the respective reject channel and that a second vacuum apparatus is arranged in each satisfactory channel, such that satisfactory tablets deflected by the respective deflector in the direction of the respective satisfactory channel are suctioned from the die plate by the vacuum produced by the second vacuum apparatus and are discharged through the respective satisfactory channel.

In a multiple rotary tablet press the treatment stations usually provided for tablet production, such as the filling station, pressing station, ejection station, are designed in the known manner repeatedly so that during one full revolution of the rotor, the tablets are produced on the plurality of groups of processing stations. By the flexible conveyor channel system according to the invention with the vacuum apparatuses used, for example, it is possible in a simple manner to discharge tablets from a plurality of reject channels or, respectively, satisfactory channels. These may be subsequently combined, in particular, for processing in further treatment devices, so that the treatment devices only have to be provided once. It is also conceivable that the tablets produced in the multiple rotary tablet press are supplied to a common satisfactory channel or, respectively, a common reject channel Thus so-called single-sided tablet discharge or even combined tablet discharge may be implemented in a simple manner.

BRIEF DESCRIPTION OF THE DRAWINGS

One exemplary embodiment of the invention is described in more detail hereinafter with reference to the drawings, in which schematically.

DETAILED DESCRIPTION OF THE INVENTION

Figure 1:
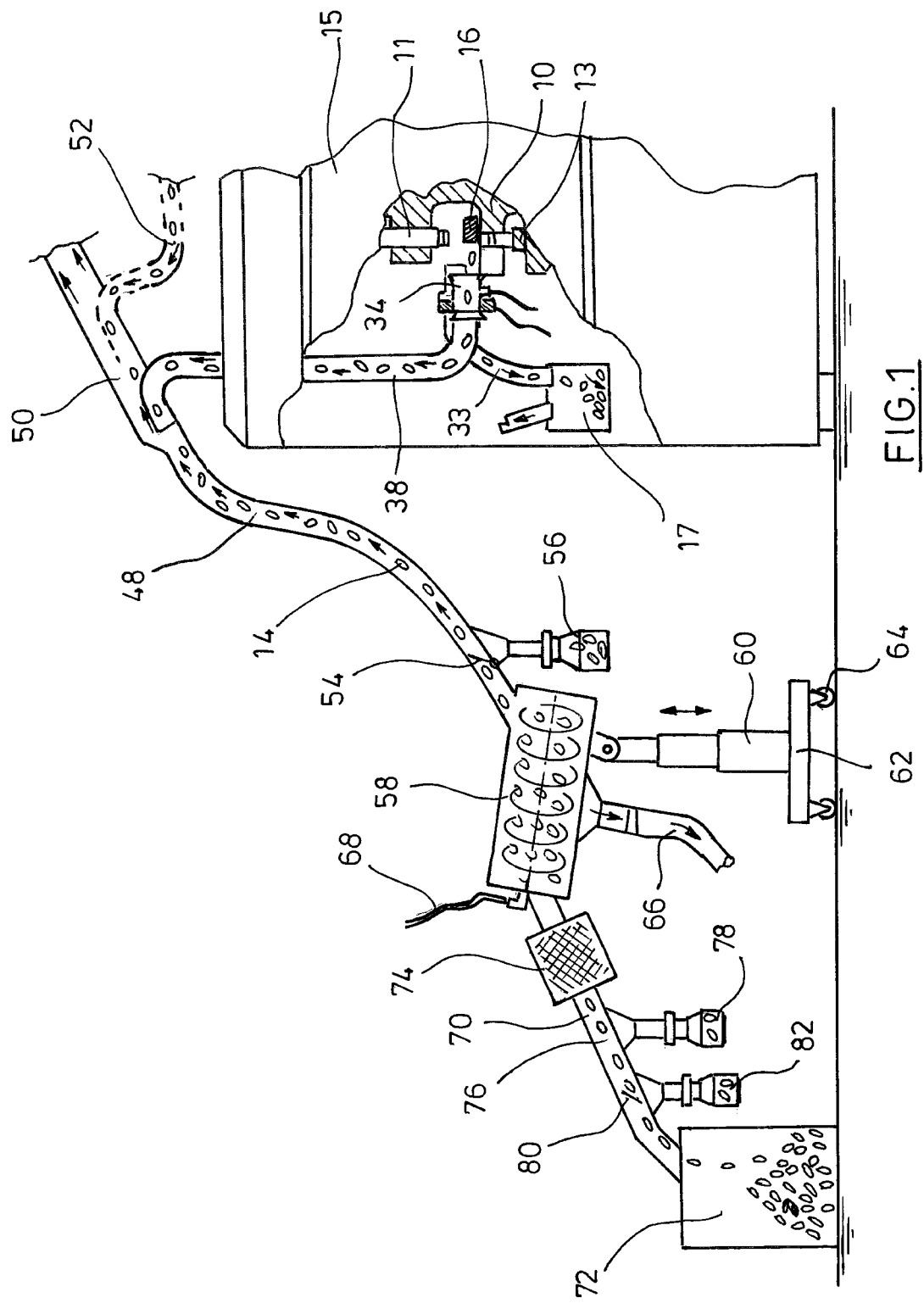
FIG. 1 illustrates a partial cross section view or an embodiment of a rotary tablet press.

Unless specified otherwise, in the figures the same reference numerals denote the same objects. In FIG. 1 at the reference numeral 15 a housing of the rotary press according to the invention is shown in a detail in a partially cut-away view. A rotor rotatably driven by a drive about a vertical axis is arranged in the housing 15 in a manner known per se. The rotor has a die plate 10. The die plate 10 may be configured in one piece or may be made up of a plurality of annular segments.

Figure 2:
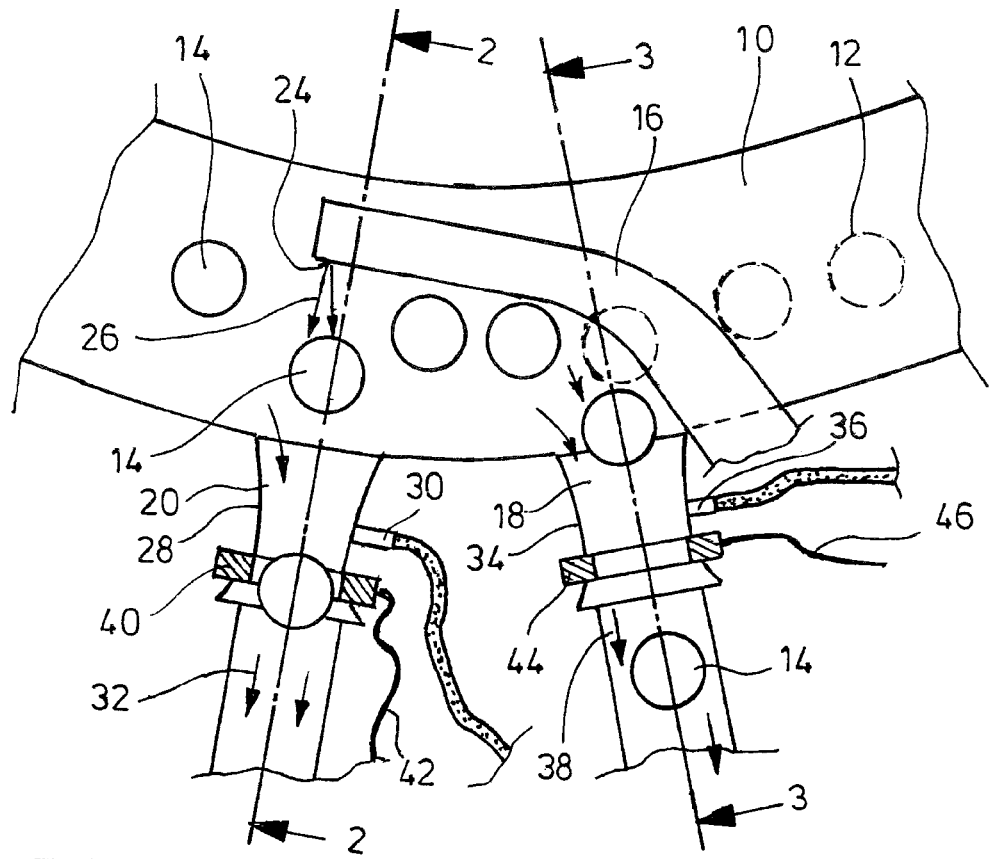
FIG. 2 illustrates a partial cross section view of the embodiment of the rotary tablet press shown in FIG. 1.

As shown in FIG. 2, the die plate 10 has a series of die bores 12 arranged along a circular path. In each case a pair of upper punches 11 (FIG. 1) and lower punches 13 (FIG. 1) are assigned to the die bores 12. In a manner known per se, the upper punches 11 (FIG. 1) and the lower punches 13 (FIG. 1) are axially guided in upper punch receivers and lower punch receivers. The axial movement thereof performed in the course of one revolution is controlled by suitable control cams in a manner also known per se. In a filling device of the rotary press (not shown) pressing material, which is filled into the die bores 12 in a manner also known per se, in at least one pressing station of the rotary tablet press is pressed by the upper punches 11 (FIG. 1) and lower punches 13 (FIG. 1) into the die bores 12 to form tablets. The die bores 12 may be formed by dies releasably inserted into the die plate 10. It is also conceivable, however, that the upper and lower punches of the rotary tablet press cooperate directly with the die bores 12 of the die plate 10 for producing tablets.

Figure 3:
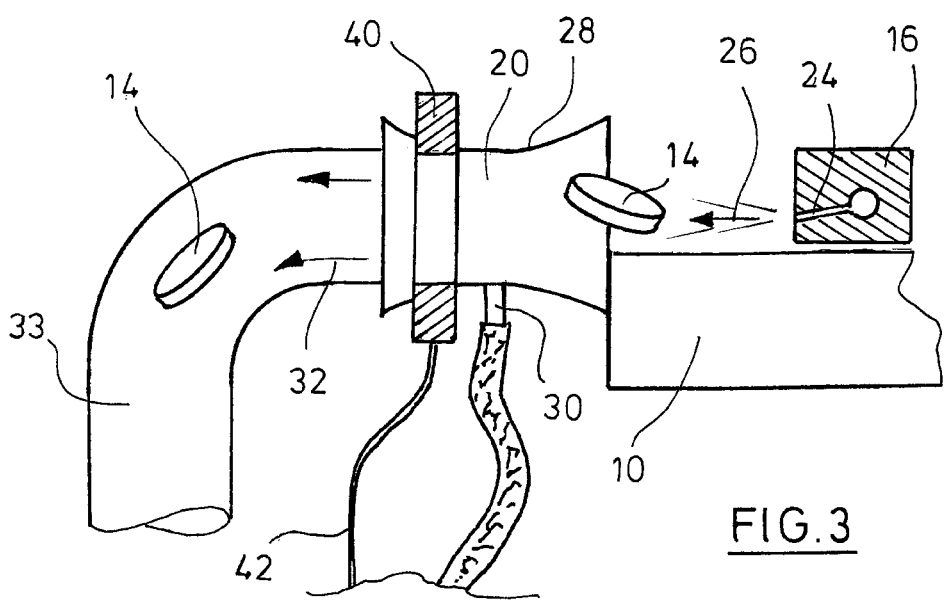
FIG. 3 illustrates a cross section view of the rotary tablet press of FIG. 2 along the line 2-2.

Still referring to FIG. 2, after producing the tablets 14, said tablets are ejected from the die bores 12 by the lower punches 13 such that they are located on the upper face of the die plate 10. The die plate 10 is assigned a deflector 16 with a sickle-shaped deflection surface, below which the die plate 10 rotates. As may be clearly identified, in particular in FIG. 2, the deflector 16 deflects the tablets 14 located on the upper face of the die plate 10 in the direction of a satisfactory channel 18. In the rotational direction of the die plate 10 is located a reject channel 20 upstream of the satisfactory channel 18. Opposite the reject channel 20 an ejection nozzle 24 is integrated in the deflector 16. If the ejection nozzle 24 is activated, it produces a puff of air in the direction of the reject channel 20 as illustrated in FIGS. 2 and 3 by the reference numeral 26. This puff of air deflects a tablet 14 located in the region of the ejection nozzle 24, before reaching the deflector 16, into the reject channel 20. The ejection nozzle 24 is activated by a control apparatus (not shown) for example the machine controller of the rotary tablet press, when the control apparatus receives a reject signal from a monitoring apparatus, also not shown in more detail, for example a pressing force measuring apparatus of the rotary tablet press. The monitoring apparatus (not shown), for example, monitors the pressing force produced when producing the tablets 14 and produces a reject signal when the pressing force deviates from a reference value in an inadmissible manner. This basic construction is known and, therefore, is not intended to be described in more detail.

Referring to FIGS. 2 and 3, a first vacuum apparatus 28, in particular a Venturi nozzle, is located in the reject channel 20 that has a cross-sectional narrowing with a suction pipe portion 30 being adjoined in the region thereof. During operation, the air flowing through the cross-sectional narrowing of the first vacuum apparatus 28 produces a vacuum in the region of the cross-sectional narrowing so that air is suctioned via the suction pipe portion 30 and entrained in the direction of conveyance away from the die plate 10 through the reject channel 20, as illustrated by the arrows 32. As a result the tablets 14 ejected by the ejection nozzle 24 into the reject channel 20 are also entrained and discharged through the reject channel 20 into a channel portion shown in FIG. 3 by the reference numeral 33, which for example leads to a reject container 17 (FIG. 1) for tablets to be ejected. The tablets 14 may be subsequently removed from this reject container 17 (FIG. 1).

Figure 4:
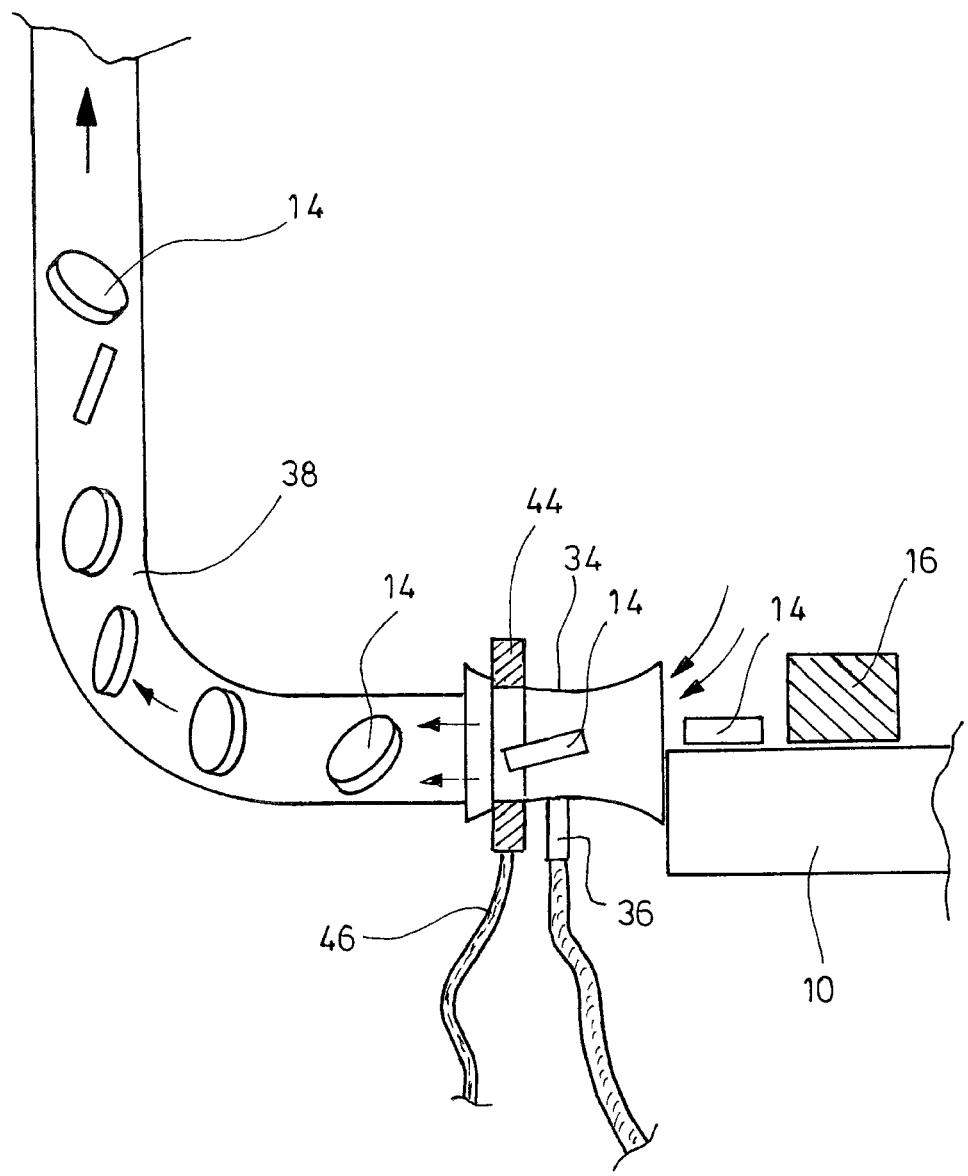
FIG. 4 illustrates a cross section view of the rotary tablet press of FIG. 2 along the line 3-3.

Referring to FIGS. 2 and 4, a second vacuum apparatus 34, in particular a Venturi nozzle with a cross-sectional narrowing, is positioned in the satisfactory channel 18 in which the deflector 16 conveys tablets 14 not ejected by the ejection nozzle 24 with a suction pipe portion 36 being adjoined in the region thereof. As in the first vacuum apparatus 28 (FIG. 3), the cross-sectional narrowing of the second vacuum apparatus 34 also results in air flowing through this cross-sectional narrowing producing a vacuum, which draws in air via the suction pipe portion 36, which then in turn is entrained through the satisfactory channel 18, in the direction of conveyance away from the die plate 10, as illustrated by the arrow 32. As a result in the example shown, all of the tablets which have been fully ejected by the lower punches 13 (FIG. 1) from the die bores 12 (FIGS. 1 and 2) and which have not been deflected into the reject channel 20 are suctioned from the die plate 10 into the satisfactory channel 18 and discharged through the satisfactory channel 18 into a rising channel portion 38 of a conveyor channel adjoining the satisfactory channel 18. The conveyor channel may be formed from conveyor tubes. As may be identified in particular in FIG. 4, the rising channel portion 38 leads to a higher height level relative to the second vacuum apparatus 34. Optionally, one or more further vacuum apparatuses may be provided further along the path of the conveyor channel.

Referring to FIG. 3, in the first vacuum apparatus 28, a tubular light barrier 40 is located in the direction of flow just downstream of the connector of the suction pipe portion 30. Via a line 42, said tubular light barrier 40 is, for example, connected to the machine controller of the rotary tablet press. As shown in FIG. 4, the second vacuum apparatus 34 has a tubular light barrier 44 that is also located in the direction of flow just behind the connector of the suction pipe portion 36, said tubular light barrier 44 also being connected via a line 46 to the machine controller of the rotary tablet press. Referring to FIGS. 3 and 4, the tubular light barriers 40, 44 detect tablets 14 conveyed past. In particular, the tubular light barrier 40 provided in the first vacuum apparatus 28 detects a tablet 14 ejected by the ejection nozzle 24 and ejected into the reject channel 20, and the light barrier 44 arranged in the second vacuum apparatus 34 correspondingly detects a gap in the tablet 14 flow deflected by the deflector 16 into the satisfactory channel 18. In this manner, a reliable redundant detection of the ejected tablets is ensured.

As may be identified in particular in FIG. 1, the rising channel portion 38 discharges into a falling channel portion 48 of the conveyor channel leading to a lower height level, by which tablets 14 entering the falling channel portion 48 through the rising channel portion 38 are conveyed further as a result of gravity. A suction channel 50 is connected to the falling channel portion 48, said suction channel 50 in turn being connected to a suction pump (not shown). The suction pump (not shown) via the suction channel 50 draws in gas from the falling channel portion 48 counter to the direction of conveyance of the tablets 14. As a result, on the one hand, the tablets 14 are braked to a desired falling speed. On the other hand, in this manner further dust is removed from the tablets 14.

At the reference numeral 52 in FIG. 1 a second rising channel portion is shown in dashed lines. In one embodiment of the rotary tablet press as a double rotary tablet press, this may, for example, come from a second tablet outlet of the press. The second tablet outlet may be designed in the same manner as described above relative to the first tablet outlet. A first sample shunt 54 is arranged in the falling channel portion 48, allowing for tablets 14, to be supplied thereby to a first sample container 56 for random sample measurements. Downstream of the first sample shunt 54 the falling channel portion 48 opens into a dust removal and deburring device 58, for example a mechanical screening drum-dust removal or, respectively, deburring device. The dust removal and deburring device 58 is arranged on a height-adjustable stand 60, which in turn stands on the ground via a foot 62 with lockable rollers 64. Tablet dust present in the dust removal and deburring device 58 is suctioned off via a dust removal line 66. An air lance is shown at the reference numeral 68.

A further falling channel portion 70 of the conveyor channel adjoins the dust removal and deburring device 58, via which the tablets 14 which have been dedusted and deburred in the dust removal and deburring device 58 are supplied to a collection container 72 for further use, in particular for packaging. A metal detector 74 may be arranged in the further falling channel portion 70. If this detects metal residues, a metal ejection shunt 76 is activated and the corresponding tablets are supplied to a metal reject container 78. Further downstream, a sample shunt 80 is located in the further falling channel portion 70, such that tablets 14 are able to be supplied to a tablet monitoring apparatus 82 by the activation of said sample shunt. The tablet monitoring apparatus is able to measure different significant parameters, for example weight, thickness, hardness and diameter of the tablets 14.

For the cleaning of the pressing system according to the invention, cleaning fluid may be supplied via a cleaning line to one or more points of the conveyor channel. For example, cleaning fluid for cleaning the vacuum apparatus 28, 34 and the rising channel portion 38 may be introduced via the suction pipe portion 36. Also, for example, cleaning fluid may be supplied in the region of the falling channel portion 48 via a suitable cleaning line.

It is also possible that the conveyor channel and the dust removal and deburring device 58 and optionally further components of the pressing system shown in FIG. 1 are arranged in a gas-tight isolated chamber, the atmosphere thereof being able to be replaced by an exhaust air line and air supply line. The tablet outlet of the rotary tablet press may then be connected in a gas-tight manner to the conveyor channel

The invention claimed is:

1. A rotary tablet press comprising:
    a rotatably driven rotor having a die plate including a plurality of die bores and an upper face;
    a plurality of upper and lower punches that rotate with the die plate, the plurality of lower punches configured to eject tablets from the plurality of die bores;
    a deflector configured to deflect tablets from the upper face of the die plate into a satisfactory channel;
    an ejection apparatus configured to eject tablets into a reject channel that is positioned upstream of the satisfactory channel;
    a monitoring apparatus configured to monitor at least one property of the tablets, wherein the monitoring apparatus is configured to produce a reject signal when the at least one property of the tablets deviates inadmissibly from a reference value;
    a control apparatus configured to actuate the ejection apparatus in response to the reject signal;
    a first vacuum apparatus positioned in the reject channel and configured to produce a vacuum, the vacuum configured to discharge tablets ejected by the ejection apparatus through the reject channel;
    a second vacuum apparatus positioned in the satisfactory channel and configured to produce a vacuum, the vacuum configured to suction tablets from the die plate which are deflected by the deflector in a direction of the satisfactory channel and discharge the suctioned tablets through the satisfactory channel; and
    at least one detector device positioned in at least one of the reject channel and the satisfactory channel and configured to detect tablets passing through the at least one of the reject channel and the satisfactory channel, wherein the at least one detector device is positioned in at least one of the first vacuum apparatus and the second vacuum apparatus.

2. The rotary tablet press according to claim 1, wherein the first vacuum apparatus is a Venturi nozzle.

3. The rotary tablet press according to claim 1, wherein the second vacuum apparatus is a Venturi nozzle.

4. The rotary tablet press according to claim 1, wherein the satisfactory channel discharges into a conveyor channel downstream of the second vacuum apparatus.

5. The rotary tablet press according to claim 4, wherein the conveyor channel comprises a rising channel portion configured to lead to a height that is greater than a height of the second vacuum apparatus.

6. The rotary tablet press according to claim 5, wherein the conveyor channel comprises a falling channel portion, the falling channel portion positioned at a lower height than the rising channel portion and configured to adjoin the rising channel portion, wherein the tablets are conveyed therethrough as a result of gravity.

7. The rotary tablet press according to claim 6, wherein a suction channel is connected to the falling channel portion and to a suction pump, the suction pump configured to suction gas from the falling channel portion via the suction channel in a direction that is counter to a conveyance of the tablets.

8. The rotary tablet press according to claim 4, wherein the conveyor channel is connected to a tablet dust removal and deburring device, wherein the tablet dust removal and deburring device is connected to a collection container.

9. The rotary tablet press according to claim 8, wherein the tablet dust removal and deburring device is a mechanical dust removal and deburring device.

10. The rotary tablet press according to claim 8, wherein a shunt is positioned in the conveyor channel, and wherein the shunt is coupled to the monitoring apparatus and configured to remove tablets from the conveyor channel and supply them to the monitoring apparatus.

11. The rotary tablet press according to claim 8, wherein the conveyor channel and the dust removal and deburring device are positioned in a gas-tight isolated chamber having an atmosphere, wherein the atmosphere is replaced via an exhaust air line and an air supply line, and wherein a tablet outlet is connected by a gas-tight connection to the conveyor channel.

12. The rotary tablet press according to claim 11, wherein the gas-tight connection of the tablet outlet to the conveyor channel comprises an inflatable seal.

13. The rotary tablet press according to claim 1, wherein the at least one detector device comprises a light barrier.

14. The rotary tablet press according to claim 1, further comprising:
- a cleaning device with a cleaning line configured to be connected to one of the satisfactory channel, the reject channel, the first vacuum apparatus, or the second vacuum apparatus; and
- a cleaning fluid supply configured to supply the cleaning line being with a cleaning fluid.

15. The rotary tablet press according to claim 1, further comprising a vacuum control apparatus configured to control the vacuum produced by the first vacuum apparatus and the vacuum produced by the second vacuum apparatus, and wherein the vacuum control apparatus is configured to adjust the vacuum produced by the first vacuum apparatus and the vacuum produced by the second vacuum apparatus independently of one another.

16. A multiple rotary tablet press comprising:
- a die plate;
- a plurality of satisfactory channels and a plurality of reject channels;
- a deflector assigned to each of the plurality of satisfactory channels; the deflector configured to deflect satisfactory tablets into a respective satisfactory channel;
- an ejection apparatus assigned to each of the plurality of reject channels and configured to eject reject tablets into one of the plurality reject channels;
- a monitoring device configured to monitor one or more characteristics of a tablet, the monitoring device configured to produce an reject signal in response to a value of the one or more characteristics being below a predetermined value;
- a control apparatus configured to actuate a respective ejection apparatus and eject the reject tablets in response to the reject signal produced by the monitoring device;
- a first vacuum apparatus positioned in each of the plurality of reject channels and configured to produce a vacuum, the vacuum configured to discharge the tablets ejected by the respective ejection apparatus through a respective reject channel; and
- a second vacuum apparatus positioned in each of the plurality of satisfactory channels and configured to produce a vacuum, the vacuum configured to suction tablets that are deflected by the respective deflector from the die plate and discharge them through a respective satisfactory channel.

17. A rotary tablet press comprising:
- a rotatably driven rotor having a die plate including a plurality of die bores and an upper face;
- a plurality of upper and lower punches that rotate with the die plate, the plurality of lower punches configured to eject tablets from the plurality of die bores;
- a deflector configured to deflect tablets from the upper face of the die plate into a satisfactory channel;
- an ejection apparatus configured to eject tablets into a reject channel that is positioned upstream of the satisfactory channel;
- a monitoring apparatus configured to monitor at least one property of the tablets, wherein the monitoring apparatus is configured to produce a reject signal when the at least one property of the tablets deviates inadmissibly from a reference value;
- a control apparatus configured to actuate the ejection apparatus in response to the reject signal;
- a first vacuum apparatus positioned in the reject channel and configured to produce a vacuum, the vacuum configured to discharge tablets ejected by the ejection apparatus through the reject channel;
- a second vacuum apparatus positioned in the satisfactory channel and configured to produce a vacuum, the vacuum configured to suction tablets from the die plate which are deflected by the deflector in a direction of the satisfactory channel and discharge the suctioned tablets through the satisfactory channel; and
- at least one detector device positioned in the first vacuum apparatus and configured to detect tablets passing through the reject channel, wherein the first vacuum apparatus is configured to suction away tablet dust deposited on the at least one detector device.

\* \* \* \* \*